April 29, 1952 L. BIRKIGT 2,594,724
SPINNING SPINDLE MECHANISM, INCLUDING
A WORM AND WORM WHEEL DRIVE
Filed Sept. 27, 1950 2 SHEETS—SHEET 1

INVENTOR
LOUIS BIRKIGT,
BY
ATTORNEY

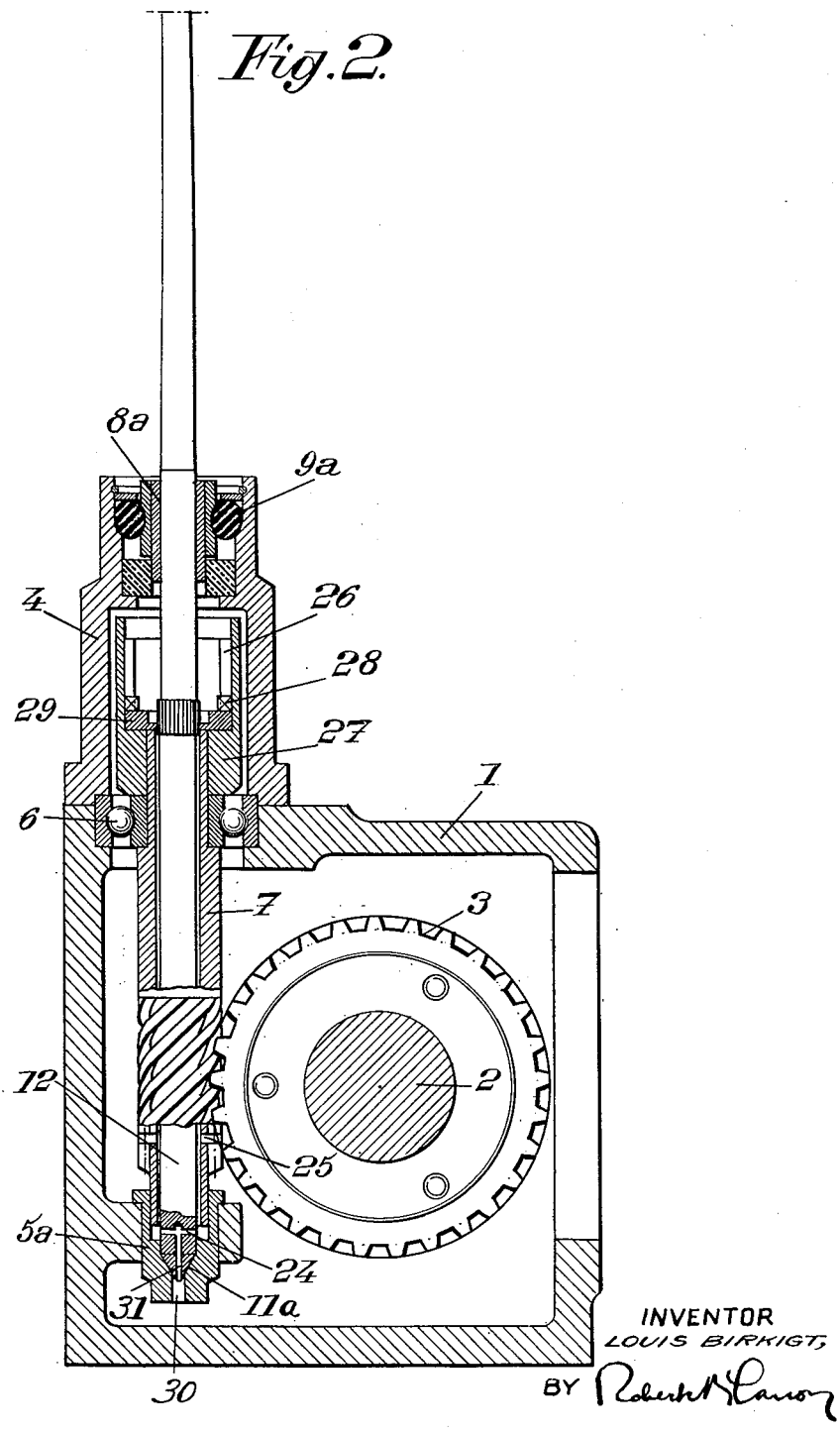

Patented Apr. 29, 1952

2,594,724

UNITED STATES PATENT OFFICE 2,594,724

SPINNING SPINDLE MECHANISM, INCLUDING A WORM AND WORM WHEEL DRIVE

Louis Birkigt, Versoix, near Geneva, Switzerland

Application September 27, 1950, Serial No. 187,024
In Luxemburg October 11, 1949

7 Claims. (Cl. 57—102)

1

The present invention relates to spinning spindle mechanisms driven by means of worms and worm wheels.

Its chief object is to provide a mechanism of this kind which is better adapted to meet the requirements of practice than those existing at this time, and in particular which are stronger and less cumbersome.

According to my invention, the worm is carried by a sleeve directly journalled in the body of the apparatus and through which extends the lower portion of the spindle, which rests through its bottom end, on a thrust bearing carried by said body, play being provided between said sleeve and the portion of the spindle located therein, to make it possible for said spindle to have radial displacements with respect to said sleeve against elastic return means urging said spindle toward coaxial position in said sleeve, the drive between said two elements being achieved through means making allowance for these radial relative displacements.

Preferred embodiments of my invention will be hereinafter described with reference to the accompanying drawings, given merely by way of example and in which:

Fig. 2 is a similar view of a second embodiment of my invention.

Figure 1:
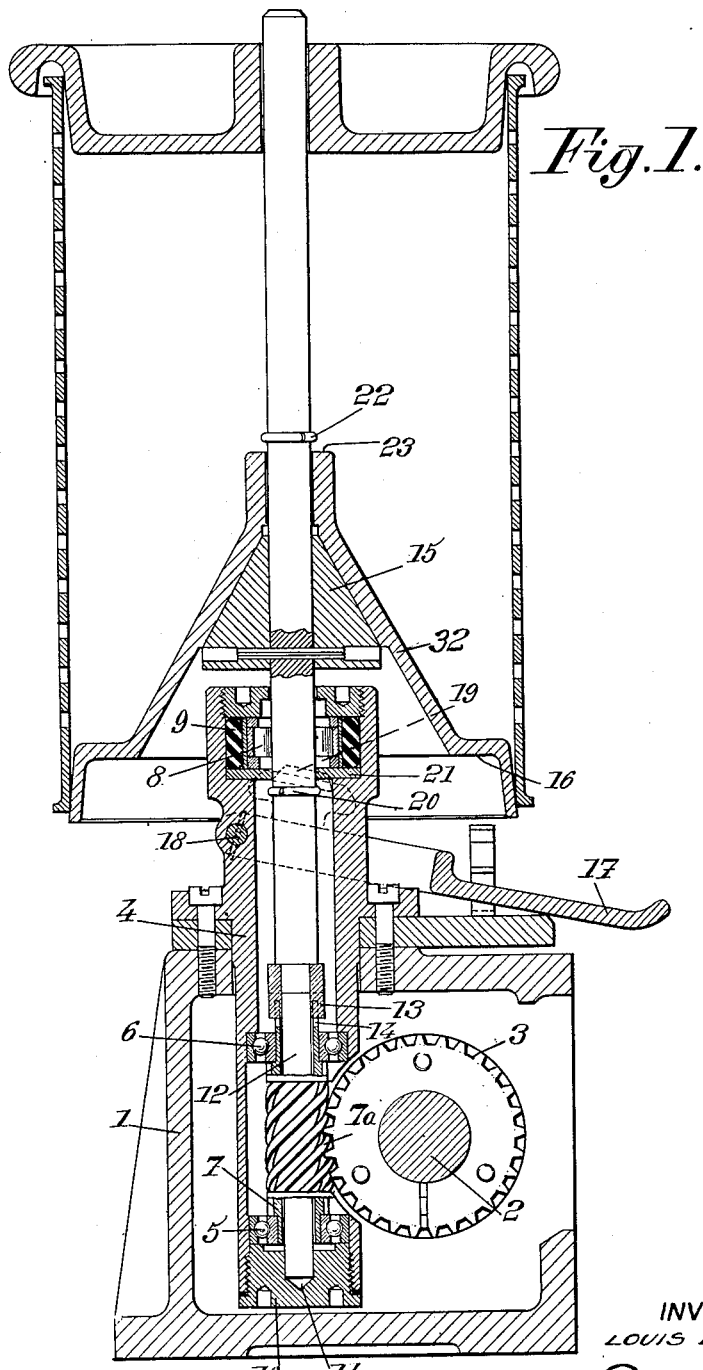
Fig. 1 shows, in axial vertical section, a spindle system made according to a first embodiment of my invention.

Inside a hollow body or casing 1 which can be fixed to a suitable support, I dispose horizontally a transverse shaft 2 carrying a worm wheel 3 to drive the spindle.

I fix vertically, to body 1, a tubular piece 4 extending through the upper wall thereof and which is made to support, through a lower ball bearing 5 and an upper ball bearing 6, a sleeve 7 carrying the teeth 7a of the worm which meshes with worm wheel 3.

Thus this worm wheel and this worm are both centered with respect to the same indeformable structure (constituted by the assembly of body 1 and tubular piece 4), whereby correct meshing is achieved.

At the upper part of tubular piece 4, which extends above body 1, there is provided a bearing 8, for instance of the roller type, the outer race of which is held in a bore of tubular piece 4, with the interposition of an elastic, for instance a rubber, ring 9.

The lower end of the spindle rests upon a thrust bearing centered with respect to body 1, which thrust bearing is advantageously rigid with said

2 body and constituted, for instance, by a plug 10 fixed to the lower end of tubular piece 4, in which plug the thrust bearing 11 is mounted.

The spindle is constituted by a metal rod including, from bottom to top, the following portions:

First, a portion capable of resting and being centered in thrust bearing 11;

Second, a cylindrical portion 12 capable of passing with a suitable play in sleeve 7;

Third, at a level slightly above said sleeve, means for rotatably coupling the sleeve and the spindle together, but making allowance for certain relative radial movements between these elements, which means may for instance be constituted by projections 13 carried by the spindle and engaging recesses 14 provided at the upper end of the sleeve;

Fourth, a cylindrical portion adapted to be housed inside bearing 8, either by direct contact between this portion and suitable rollers, or through an inner roller race; and Fifth, the upper portion of the spindle, which portion may have any desired shape to support a given type of bobbin.

Of course, the mechanism just above described further includes means for causing the bobbin to be frictionally driven by the spindle and, possibly, means for disconnecting the bobbin from the spindle, while braking this bobbin.

In the embodiment of Fig. 1, which shows a bobbin for big work, turning at relatively low speed, the last mentioned means are made as follows:

The spindle, above the upper end of tubular piece 4, carries, fixed thereto, a frusto-conical friction element 15 the small base of which is at the top.

The bottom end part 32 of the bobbin is given a conical shape such that it can fit on said frusto-conical element, whereby a suitable drive of the bobbin is ensured, for instance under the mere effect of the weight of the bobbin.

On the other hand, part 32 includes an annular flange 16 adapted to cooperate with friction shoes 19 carried by a lever 17 pivoted to piece 4 about a pin 18. Thus, when said lever 17 is pulled upwardly, said shoes both exert a braking effect on flange 16, and lift the bobbin away from frusto-conical element 15, whereby the bobbin is no longer driven by the spindle.

In order to keep the spindle in position axially when the bobbin is lifted up and to prevent an excessive lift of said bobbin under the thrust of the shoes, I provide, on the spindle: on the one hand an annular abutment 20, located some millimeters under a partition 21 through which the spindle extends and which is located under bearing 8, and, on the other hand, an annular abutment 22, some millimeters above the upper edge 23 of the bottom of the bobbin.

Both of these abutments may be constituted by split rings engaged in peripheral grooves formed around the spindle.

Such a spindle is supported at its bottom end by bearing 11 and, at an upper level, by elastic bearing 8, preferably located at such a level that the distance between thrust bearing 11 and the coupling means interposed between sleeve 7 and the spindle is about equal to the distance between said coupling means and elastic bearing 8.

Thus the different sections of the spindle, except at the lower end thereof, will be free to move out of center, during their rotation, as much as will be necessary to obtain a good balancing of the revolving structure and, whatever be the deformations of the spindle, these deformations will in no way influence the centering of sleeve 7, which will be kept in correct meshing engagement with worm wheel 3.

Fig. 2 shows another embodiment of the invention which differs in particular by the following points:

The lower end of sleeve 7 is guided by a smooth bearing 5a carried by a shoulder integral with the inner wall of body 1. This bearing has a conical bottom which acts as a thrust bearing 11a for spindle 12 and it is provided with an axial hole 30 so as to enable the lubricant present in body 1 to pass through a bore 31 provided along the axis of the spindle, into radial conduits 24 through which it is driven by the centrifugal force into the annular space existing between spindle 12 and the inner wall of sleeve 7. Other radial conduits 25, provided in the wall of said sleeve, make it possible for this lubricant to flow, in the form of a centrifugal jet, into the vicinity of the zone of cooperation of worm wheel 3 with its worm.

The elastic system interposed between the spindle upper smooth bearing 8a and tubular piece 4, is constituted by a toroidal rubber ring; spindle 12 is driven by sleeve 7 through a centrifugal clutch including centrifugal masses 26 cooperating, through their semi-cylindrical outer side walls, with the inner wall of a sleeve 27 fixed to sleeve 7. These masses are driven in rotation by projections 28 carried by a disc 29 coupled with spindle 12 through cooperating ribs and grooves.

The operation of such a clutch is as follows, the spindle being supposed to be stopped:

As soon as sleeve 7 is rotated, sleeve 27, which turns together with said sleeve, drives disc 29 by friction with the lower face thereof and the projections 28 of this disc cause masses 26 to rotate. These masses are then applied against the inner wall of sleeve 27 and couple the driving member constituted by sleeve 27 with disc 29 and the driven member constituted by spindle 12.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. In a spinning machine, the combination of a frame, a vertical sleeve directly journalled in said frame, worm teeth carried by said sleeve, a worm wheel in mesh with said worm teeth, a driving shaft for said worm wheel journalled in said frame, a thrust bearing carried by said frame under said sleeve in line therewith, a vertical spindle resting on said thrust bearing and extending upwardly through said sleeve with a material play between the outer wall of said spindle and the inner wall of said sleeve, elastic means for urging said spindle toward coaxial relation with said sleeve, and cooperating means on said spindle and said sleeve, respectively, for rotatably coupling them together, the last mentioned means being arranged with radial relative play so as not to interfere with the radial displacements of said spindle in said sleeve.

2. In a spinning machine, the combination of a frame, a vertical sleeve directly journalled in said frame, worm teeth carried by said sleeve, a worm wheel in mesh with said worm teeth, a driving shaft for said worm wheel journalled in said frame, a thrust bearing carried by said frame under said sleeve and coaxially therewith, an elastic bearing carried by said frame above said sleeve in line therewith, a spindle journalled in both of said bearings having an outer diameter smaller than the inner diameter of said sleeve whereby it can have limited radial displacements in said sleeve against the guiding action of said elastic bearing, and cooperating means on said spindle and said sleeve, respectively, for rotatably coupling them together, the last mentioned means being arranged with radial relative play so as not to interfere with the radial displacements of said spindle in said sleeve.

3. In a spinning machine, the combination of a frame, a vertical sleeve directly journalled in said frame, worm teeth carried by said sleeve, a worm wheel in mesh with said worm teeth, a driving shaft for said worm wheel journalled in said frame, a thrust bearing rigid with said frame located under said sleeve coaxially therewith, an elastic bearing carried by said frame above said sleeve in line therewith, a spindle journalled in both of said bearings having an outer diameter smaller than the inner diameter of said sleeve whereby it can have limited radial displacements in said sleeve against the guiding action of said elastic bearing, and cooperating means on said spindle and said sleeve, respectively, for rotatably coupling them together, the last mentioned means being arranged with radial relative play so as not to interfere with the radial displacements of said spindle in said sleeve.

4. In a spinning machine, the combination of a frame, a vertical sleeve directly journalled in said frame, worm teeth carried by said sleeve, a worm wheel in mesh with said worm teeth, a driving shaft for said worm wheel journalled in said frame, a thrust bearing carried by said frame under said sleeve, a spindle resting on said thrust bearing having an outer diameter smaller than the inner diameter of said sleeve whereby it can have limited radial displacements with respect thereto, elastic return means urging said spindle toward coaxial relation with said sleeve, and cooperating means at the top of said sleeve on said spindle and said sleeve, respectively, for rotatably coupling them together, the last mentioned means being arranged with radial relative play so as not to interfere with the radial displacements of said spindle in said sleeve.

5. A mechanism according to claim 4 in which the sleeve is provided, at the top end thereof, with radial recesses, including radial projections carried by said spindle and engaged in said recesses to form said coupling means.

6. A mechanism according to claim 2 in which the elastic bearing located above the sleeve is at a level such that the distance between the lower thrust bearing and the coupling means is of the same order of magnitude as the distance between said coupling means and said elastic bearing.

7. In a spinning machine, the combination of a frame, a vertical sleeve directly journalled in said frame, worm teeth carried by said sleeve, a worm wheel in mesh with said worm teeth, a driving shaft for said worm wheel journalled in said frame, a thrust bearing carried by said frame under said sleeve, a spindle resting on said thrust bearing and having an outer diameter smaller than the inner diameter of said sleeve whereby it can have limited radial displacements in said sleeve, elastic return means urging said spindle toward coaxial relation with said sleeve, cooperating means on said spindle and said sleeve, respectively, for rotatably coupling them together, the last mentioned means being arranged with radial play so as not to interfere with radial displacements of said spindle in said sleeve, and means for circulating a lubricant in at least a portion of the space between said spindle and said sleeve.

LOUIS BIRKIGT.

REFERENCES CITED

The following references are of record in the file of this patent:

UNITED STATES PATENTS

| Number | Name | Date |
| --- | --- | --- |
| 1,317,302 | Lyth | Sept. 30, 1919 |
| 1,395,529 | Stott | Nov. 1, 1921 |
| 1,772,315 | Kanter et al. | Aug. 5, 1930 |
| 1,774,666 | Rabert | Sept. 2, 1930 |
| 1,785,560 | Rabert | Dec. 16, 1930 |
| 1,924,176 | Banfield, Jr., et al. | Aug. 29, 1933 |